United States Patent
Krishna Kumar et al.

(10) Patent No.: US 9,064,191 B2
(45) Date of Patent: Jun. 23, 2015

(54) LOWER MODIFIER DETECTION AND EXTRACTION FROM DEVANAGARI TEXT IMAGES TO IMPROVE OCR PERFORMANCE

(71) Applicant: QUALCOMM Incorporated, San Diego, CA (US)

(72) Inventors: Raj Kumar Krishna Kumar, Bangalore (IN); Pawan Kumar Baheti, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 13/791,188

(22) Filed: Mar. 8, 2013

(65) Prior Publication Data
US 2013/0195360 A1    Aug. 1, 2013

Related U.S. Application Data

(63) Continuation-in-part of application No. 13/748,539, filed on Jan. 23, 2013, and a continuation-in-part of application No. 13/748,574, filed on Jan. 23, 2013.

(Continued)

(51) Int. Cl.
*G06K 9/78* (2006.01)
*G06K 9/32* (2006.01)

(52) U.S. Cl.
CPC .. *G06K 9/78* (2013.01); *G06K 9/32* (2013.01); *G06K 2209/013* (2013.01)

(58) Field of Classification Search
CPC .......... G06K 9/34; G06K 9/348; G06K 9/78; G06K 9/80; G06K 2209/013; G06T 7/0079; G06T 7/0081
USPC ................. 382/173, 177, 178, 185, 186, 203
See application file for complete search history.

(56) References Cited

U.S. PATENT DOCUMENTS

| 3,710,321 A | 1/1973 | Rubenstein ................. 340/146.3 |
| 4,654,875 A | 3/1987 | Srihari et al. .................... 382/40 |

(Continued)

FOREIGN PATENT DOCUMENTS

| EP | 1146478 A2 | 10/2001 | ................ G06T 5/00 |
| EP | 1840798 A1 | 10/2007 | ............... G06K 9/32 |

(Continued)

OTHER PUBLICATIONS

Chaudhury S. (Eds.): "OCR Technical Report for the project Development of Robust Document Analysis and Recognition System for Printed Indian Scripts", 2008, pp. 149-153, XP002712777, Retrieved from the Internet: URL:http://researchweb.iiit.ac.inj-jinesh/ocrDesignDoc.pdf [retrieved on Sep. 5, 2013].

(Continued)

*Primary Examiner* — Andrew W Johns
(74) *Attorney, Agent, or Firm* — Silicon Valley Patent Group LLP

(57) ABSTRACT

Systems, apparatus and methods for extracting lower modifiers from a word image, before performing optical character recognition (OCR), based on a plurality of tests comprising a first test, a second test and a third test are presented. The method obtains the word image and performing a plurality of tests (e.g., a first test, a second test and a third test). The first test determines whether a vertical line spanning the height of the word image exists. The second test determines whether a jump of a number of components in the lower portion of the word image exists. The third test determines sparseness in a lower portion of the word image. The plurality of tests may run sequentially and/or in parallel. Results from the plurality of tests are used to decide whether a lower modifier exists by comparing and accumulating test results from the plurality of tests.

22 Claims, 12 Drawing Sheets

Related U.S. Application Data

(60) Provisional application No. 61/674,705, filed on Jul. 23, 2012, provisional application No. 61/673,606, filed on Jul. 19, 2012, provisional application No. 61/674,824, filed on Jul. 23, 2012, provisional application No. 61/677,291, filed on Jul. 30, 2012, provisional application No. 61/673,703, filed on Jul. 19, 2012, provisional application No. 61/590,983, filed on Jan. 26, 2012, provisional application No. 61/590,966, filed on Jan. 26, 2012, provisional application No. 61/590,973, filed on Jan. 26, 2012, provisional application No. 61/673,703, filed on Jul. 19, 2012, provisional application No. 61/590,983, filed on Jan. 26, 2012, provisional application No. 61/590,966, filed on Jan. 26, 2012, provisional application No. 61/590,973, filed on Jan. 26, 2012.

(56) References Cited

U.S. PATENT DOCUMENTS

| | | | |
|---|---|---|---|
| 5,321,768 A | 6/1994 | Fenrich et al. | 382/9 |
| 5,459,739 A | 10/1995 | Handley et al. | 371/36 |
| 5,465,304 A | 11/1995 | Cullen et al. | 382/176 |
| 5,519,786 A | 5/1996 | Courtney et al. | 382/159 |
| 5,563,403 A | 10/1996 | Bessho et al. | 250/208.1 |
| 5,633,954 A | 5/1997 | Gupta et al. | 382/187 |
| 5,751,850 A | 5/1998 | Rindtorff | 382/178 |
| 5,764,799 A | 6/1998 | Hong et al. | 382/225 |
| 5,768,451 A | 6/1998 | Hisamitsu et al. | 382/309 |
| 5,805,747 A | 9/1998 | Bradford | 382/310 |
| 5,835,633 A | 11/1998 | Fujisaki et al. | 382/187 |
| 5,844,991 A | 12/1998 | Hochberg et al. | 332/218 |
| 5,978,443 A | 11/1999 | Patel | 378/62 |
| 6,023,536 A | 2/2000 | Visser | 382/310 |
| 6,092,045 A | 7/2000 | Stubley et al. | 704/254 |
| 6,266,439 B1 | 7/2001 | Pollard et al. | 382/164 |
| 6,393,443 B1 | 5/2002 | Rubin et al. | 707/533 |
| 6,473,517 B1 | 10/2002 | Tyan et al. | 382/105 |
| 6,674,919 B1 | 1/2004 | Ma et al. | 382/289 |
| 6,678,415 B1 | 1/2004 | Popat et al. | 382/226 |
| 6,687,421 B1 | 2/2004 | Navon | 382/289 |
| 6,738,512 B1 | 5/2004 | Chen et al. | 382/176 |
| 6,954,795 B2 | 10/2005 | Takao et al. | 709/231 |
| 7,110,621 B1 | 9/2006 | Greene et al. | 382/310 |
| 7,142,727 B2 | 11/2006 | Notovitz et al. | 382/289 |
| 7,263,223 B2 | 8/2007 | Irwin | 382/176 |
| 7,333,676 B2 | 2/2008 | Myers et al. | 382/289 |
| 7,403,661 B2 | 7/2008 | Curry et al. | 382/232 |
| 7,450,268 B2 | 11/2008 | Martinez et al. | 358/1.9 |
| 7,724,957 B2 | 5/2010 | Abdulkader | 382/186 |
| 7,738,706 B2 | 6/2010 | Aradhye et al. | 382/182 |
| 7,783,117 B2 | 8/2010 | Liu et al. | 382/232 |
| 7,817,855 B2 | 10/2010 | Yuille et al. | 382/176 |
| 7,889,948 B2 | 2/2011 | Steedly et al. | 382/294 |
| 7,961,948 B2 | 6/2011 | Katsuyama | 382/182 |
| 7,984,076 B2 | 7/2011 | Kobayashi et al. | 707/803 |
| 8,009,928 B1 | 8/2011 | Manmatha et al. | 382/283 |
| 8,189,961 B2 | 5/2012 | Nijemcevic et al. | 382/292 |
| 8,194,983 B2 | 6/2012 | Al-Omari et al. | 382/198 |
| 8,285,082 B2 | 10/2012 | Heck | 382/305 |
| 8,306,325 B2 | 11/2012 | Chang | 382/176 |
| 8,417,059 B2 | 4/2013 | Yamada | 382/283 |
| 8,542,926 B2 | 9/2013 | Panjwani et al. | 382/176 |
| 8,644,646 B2 | 2/2014 | Heck | 332/305 |
| 2003/0026482 A1 | 2/2003 | Dance | 382/199 |
| 2003/0099395 A1 | 5/2003 | Wang et al. | 382/165 |
| 2003/0215137 A1 | 11/2003 | Wnek | 382/181 |
| 2004/0179734 A1 | 9/2004 | Okubo | 382/182 |
| 2004/0240737 A1 | 12/2004 | Lim et al. | 382/182 |
| 2005/0041121 A1 | 2/2005 | Steinberg et al. | 348/239 |
| 2005/0123199 A1 | 6/2005 | Mayzlin et al. | 382/181 |
| 2005/0238252 A1 | 10/2005 | Prakash et al. | 382/289 |
| 2006/0039605 A1 | 2/2006 | Koga | 382/182 |
| 2006/0215231 A1 | 9/2006 | Borrey et al. | 358/448 |
| 2006/0291692 A1 | 12/2006 | Nakao et al. | 382/101 |
| 2007/0110322 A1 | 5/2007 | Yuille et al. | 382/227 |
| 2007/0116360 A1 | 5/2007 | Jung et al. | 382/176 |
| 2007/0217676 A1 | 9/2007 | Grauman et al. | 382/170 |
| 2008/0008386 A1 | 1/2008 | Anisimovich et al. | 382/182 |
| 2008/0063273 A1 | 3/2008 | Shimodaira | 382/171 |
| 2008/0112614 A1 | 5/2008 | Fluck et al. | 382/168 |
| 2009/0060335 A1 | 3/2009 | Rodriguez et al. | 382/177 |
| 2009/0202152 A1 | 8/2009 | Takebe et al. | 382/185 |
| 2009/0232358 A1 | 9/2009 | Cross | 382/103 |
| 2009/0252437 A1 | 10/2009 | Li et al. | 382/289 |
| 2009/0316991 A1 | 12/2009 | Geva et al. | 382/176 |
| 2009/0317003 A1 | 12/2009 | Heilper et al. | 382/229 |
| 2010/0049711 A1 | 2/2010 | Singh et al. | 707/6 |
| 2010/0067826 A1 | 3/2010 | Honsinger et al. | 382/280 |
| 2010/0080462 A1 | 4/2010 | Miljanic et al. | 382/186 |
| 2010/0128131 A1 | 5/2010 | Tenchio et al. | 348/207.1 |
| 2010/0141788 A1 | 6/2010 | Hwang et al. | 348/222.1 |
| 2010/0144291 A1 | 6/2010 | Stylianou et al. | 455/90.1 |
| 2010/0172575 A1 | 7/2010 | Lukac et al. | 382/164 |
| 2010/0195933 A1 | 8/2010 | Nafarieh | 382/289 |
| 2010/0232697 A1 | 9/2010 | Mishima et al. | 382/168 |
| 2010/0239123 A1 | 9/2010 | Funayama et al. | 382/103 |
| 2010/0245870 A1 | 9/2010 | Shibata | 358/1.9 |
| 2010/0272361 A1 | 10/2010 | Khorsheed et al. | 382/187 |
| 2010/0296729 A1 | 11/2010 | Mossakowski | 382/165 |
| 2011/0052094 A1 | 3/2011 | Gao et al. | 382/296 |
| 2011/0081083 A1 | 4/2011 | Lee et al. | 382/182 |
| 2011/0188756 A1 | 8/2011 | Lee et al. | 382/185 |
| 2011/0215147 A1 | 9/2011 | Goncalves | 235/383 |
| 2011/0222768 A1 | 9/2011 | Galic et al. | 382/170 |
| 2011/0249897 A1 | 10/2011 | Chaki et al. | 382/177 |
| 2011/0274354 A1 | 11/2011 | Nijemcevic | 382/177 |
| 2011/0280484 A1 | 11/2011 | Ma et al. | 382/185 |
| 2011/0285873 A1 | 11/2011 | Showering et al. | 348/231.99 |
| 2012/0051642 A1 | 3/2012 | Berrani et al. | 382/180 |
| 2012/0066213 A1 | 3/2012 | Ohguro | 707/723 |
| 2012/0092329 A1 | 4/2012 | Koo et al. | 345/419 |
| 2012/0114245 A1 | 5/2012 | Lakshmanan et al. | 382/186 |
| 2012/0155754 A1 | 6/2012 | Chen et al. | 382/164 |
| 2013/0001295 A1 | 1/2013 | Goncalves | 235/375 |
| 2013/0058575 A1 | 3/2013 | Koo et al. | 382/176 |
| 2013/0129216 A1 | 5/2013 | Tsai et al. | 332/170 |
| 2013/0194448 A1 | 8/2013 | Baheti et al. | G06K 9/00456 |
| 2013/0195315 A1 | 8/2013 | Baheti et al. | G06T 11/60 |
| 2013/0195376 A1 | 8/2013 | Baheti et al. | G06K 9/36 |
| 2013/0308860 A1 | 11/2013 | Mainali et al. | G06K 9/4671 |
| 2014/0003709 A1 | 1/2014 | Ranganathan et al. | 382/159 |
| 2014/0022406 A1 | 1/2014 | Baheti et al. | G06T 3/608 |
| 2014/0023270 A1 | 1/2014 | Baheti et al. | G06K 9/4661 |
| 2014/0023271 A1 | 1/2014 | Baheti et al. | G06K 9/4661 |
| 2014/0023273 A1 | 1/2014 | Baheti et al. | G06K 9/72 |
| 2014/0023274 A1 | 1/2014 | Barman et al. | G06K 9/78 |
| 2014/0023275 A1 | 1/2014 | Krishna Kumar et al. | G06K 9/58 |
| 2014/0023278 A1 | 1/2014 | Krishna Kumar et al. | G06K 9/4671 |
| 2014/0161365 A1 | 6/2014 | Acharya et al. | G06K 9/00469 |
| 2014/0168478 A1 | 6/2014 | Baheti et al. | G06K 9/2054 |

FOREIGN PATENT DOCUMENTS

| | | | | |
|---|---|---|---|---|
| EP | 2192527 A1 | 6/2010 | | G06K 9/22 |
| GB | 2453366 A | 4/2009 | | G10L 15/18 |
| GB | 2468589 A | 9/2010 | | G06T 7/00 |
| WO | 2004077358 A1 | 9/2004 | | G06T 5/00 |

OTHER PUBLICATIONS

Chen Y.L., "A knowledge-based approach for textual information extraction from mixed text/graphics complex Document images", Systems Man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.

Pal U. et al., "Multi-skew detection of Indian script documents" Document Analysis and Recognition, 2001. Proceedings. Sixth International Conference on Seattle, WA, USA Sep. 10-13, 2001, Los Aalmitos, CA, USA, IEEE Comput. Soc. US, Sep. 10, 2001, pp. 292-296, XP010560519, DOI:10.1109/ICDAR.2001.953801, ISBN: 978-0-7695-1263-1.

(56) References Cited

OTHER PUBLICATIONS

Ray A.K. et al., "Information Technology—Principles and Applications", 2004, Prentice-Hall of India Private Limited, New Delhi, XP002712579, ISBN: 81-203-2184-7, pp. 529-531.

Song Y., et al., "A Handwritten Character Extraction Algorithm for Multi-language Document Image", 2011 International Conference on Document Analysis and Recognition, Sep. 18, 2011, pp. 93-98, XP055068675, DOI: 10.1109/ICDAR.2011.28, ISBN: 978-1-45-771350-7.

Uchida S. et al., "Skew Estimation by Instances", 2008 The Eighth IAPR International Workshop on Document Analysis Systems, Sep. 1, 2008, pp. 201-208, XP055078375, DOI: 10.1109/DAS.2008.22, ISBN: 978-0-76-953337-7.

Wu V., et al., "TextFinder: An Automatic System to Detect and Recognize Text in Images", IEEE Transactions on Pattern Analysis and Machine Intelligence, vol. 21, No. 11, Nov. 1, 1999, pp. 1224-1229, XP055068381.

Epshtein et al, "Detecting text in natural scenes with stroke width transform," Computer Vision and Pattern Recognition (CVPR) 2010, pp. 2963-2970.

Mikulik, et al., "Construction of Precise Local Affine Frames," Center for Machine Perception, Czech Technical University in Prague, Czech Republic, pp. 1-5, Abstract and second paragraph of Section 1; Algorithms 1 & 2 of Section 2 and Section 4.

Chen H., et al., "Robust Text Detection in Natural Images With Edge-Enhanced Maximally Stable Extremal Regions," believed to be published in IEEE International Conference on Image Processing (ICIP), Sep. 2011, pp. 1-4.

Dlagnekov L., et al., "Detecting and Reading Text in Natural Scenes," Oct. 2004, pp. 1-22.

Elgammal A.M., et al., "Techniques for Language Identification for Hybrid Arabic-English Document Images," believed to be published in 2001 in Proceedings of IEEE 6th International Conference on Document Analysis and Recognition, pp. 1-5.

Holmstrom L., et al., "Neural and Statistical Classifiers—Taxonomy and Two Case Studies," IEEE Transactions on Neural Networks, Jan. 1997, pp. 5-17, vol. 8 (1).

Jain A.K., et al., "Automatic Text Location in Images and Video Frames," believed to be published in Proceedings of Fourteenth International Conference on Pattern Recognition, vol. 2, Aug. 1998, pp. 1497-1499.

Machine Learning, retrieved from http://en.wikipedia.org/wiki/Machine_learning, May 7, 2012, pp. 1-8.

Moving Average, retrieved from http://en.wikipedia.org/wiki/Moving_average, Jan. 23, 2013, pp. 1-5.

Nister D., et al., "Linear Time Maximally Stable Extremal Regions," ECCV, 2008, Part II, LNCS 5303, pp. 183-196, published by Springer-Verlag Berlin Heidelberg.

Pardo M., et al., "Learning From Data: A Tutorial With Emphasis on Modern Pattern Recognition Methods," IEEE Sensors Journal, Jun. 2002, pp. 203-217, vol. 2 (3).

Park, J-M. et al., "Fast Connected Component Labeling Algorithm Using a Divide and Conquer Technique," believed to be published in Matrix (2000), vol. 4 (1), pp. 4-7, Publisher: Elsevier Ltd.

Renold M., "Detecting and Reading Text in Natural Scenes," Master's Thesis, May 2008, pp. 1-59.

Shin H., et al., "Application of Floyd-Warshall Labelling Technique: Identification of Connected Pixel Components in Binary Image," Kangweon-Kyungki Math. Jour. 14(2006), No. 1, pp. 47-55.

Vedaldi A., "An Implementation of Multi-Dimensional Maximally Stable Extremal Regions" Feb. 7, 2007, pp. 1-7.

VLFeat—Tutorials—MSER, retrieved from http://www.vlfeat.org/overview/mser.html, Apr. 30, 2012, pp. 1-2.

"4.1 Points and patches" In: Szeliski Richard: "Computer Vision—Algorithms and Applications", 2011, Springer-Verlag, London, XP002696110, p. 195, ISBN: 978-1-84882-934-3.

Agrawal M., et al., "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193, ISBN: 978-1-84888-329-3.

Chowdhury A.R., et al., "Text Detection of Two Major Indian Scripts in Natural Scene Images", Sep. 22, 2011 (Sep. 2, 2011), Camera-Based Document Analysis and Recognition, Springer Berlin Heidelberg, pp. 42-57, XP019175802, ISBN: 978-3-642-29363-4.

Ghoshal R., et al., "Headline Based Text Extraction from Outdoor Images", 4th International Conference on Pattern Recognition and Machine Intelligence, Springer LNCS, vol. 6744, Jun. 27, 2011, pp. 446-451, XP055060285.

Papandreou A. et al., "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.

Setlur, et al., "Creation of data resources and design of an evaluation test bed for Devanagari script recognition", Research Issues in Data Engineering: Multi-lingual Information Management, RIDE-MILIM 2003. Proceedings. 13th International Workshop, 2003, pp. 55-61.

Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.

Chaudhuri B.B., et al., "An OCR system to read two Indian language scripts: Bangle and Devnagari (Hindi)", Proceedings of the 4th International Conference on Document Analysis and Recognition. (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.

Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.

Forssen P.E., et al., "Shape Descriptors for Maximally Stable Extremal Regions", Computer Vision, 2007. ICCV 2007. IEEE 11th International Conference on, IEEE, PI, Oct. 1, 2007, pp. 1-8, XP031194514 , ISBN: 978-1-4244-1630-1 abstract Section 2. Multiresoltuion MSER.

International Search Report and Written Opinion—PCT/US2013/051144—ISA/EPO—Nov. 12, 2013.

Minoru M., Ed., "Character Recognition", Aug. 2010, Sciyo, XP002715748, ISBN: 978-953-307-105-3 pp. 91-95, p. 92, secton "7.3 Baseline Detection Process".

Pal U., et al., "OCR in Bangle: an Indo-Bangladeshi language", Pattern Recognition, 1994. vol. 2—Conference B: Computer Vision & Image Processing., Proceedings of the 12th IAPR International. Conferenc E on Jerusalem, Israel Oct. 9-13, 1994, Los Alamitos, CA, USA, IEEE Comput. Soc, vol. 2, Oct. 9, 1994, pp. 269-273, XP010216292, DOI: 10.1109/ICPR.1994.576917 ISBN: 978-0-8186-6270-6 the whole document.

Premaratne H L et al: "Lexicon and hidden Markov model-based optimisation of the recognised Sinhala script", Pattern Recognition Letters, Elsevier, Amsterdam, NL, vol. 27, No. 6, Apr. 15, 2006 , pp. 696-705, XP027922538, ISSN: 0167-8655.

Senda S et al: "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.

Senk V et al: "A new bidirectional algorithm for decoding trellis codes," EUROCON' 2001, Trends in Communications, International Conference on Jul. 4-7, 2001, Piscataway, NJ, USA, IEEE, Jul. 4, 2001, pp. 34-36, vol. .I, XP032155513, DOI :10.1109/EURCON.2001.937757 ISBN : 978-0-7803-6490-5.

Sinha R.M.K., et al., "On Devanagari document processing", Systems, Man and Cybernetics, 1995. Intelligent Systems for the 21st Century., IEEE International Conference on Vancouver, BC, Canada Oct. 22-25, 1995, New York, NY, USA,IEEE, US, vol. 2, Oct. 22, 1995, pp. 1621-1626, XP010194509, DOI: 10.1109/ICSMC.1995.538004 ISBN: 978-0-7803-2559-3 the whole document.

(56) References Cited

OTHER PUBLICATIONS

Unser M., "Sum and Difference Histograms for Texture Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand column p. 123.

Chaudhuri et al., "Skew Angle Detection of Digitized Indian Script Documents", IEEE Transactions on Pattern Analysis and Machine Intelligence, Feb. 1997, pp. 182-186, vol. 19, No. 2.

Chen, et al.,, "Detecting and reading text in natural scenes," IEEE Computer Society Conference on Computer Vision and Pattern Recognition (CVPR'04), 2004, pp. 1-8.

Jain, et al., "Automatic text location in images and video frames", Pattern Recognition, 1998, pp. 2055-2076, vol. 31, No. 12.

Jayadevan, et al., "Offline Recognition of Devanagari Script: A Survey", IEEE Transactions on Systems, Man, and Cybernetics—Part C: Applications and Reviews, 2010, pp. 1-15.

Kapoor et al., "Skew angle detection of a cursive handwritten Devanagari script character image", Indian Institute of Science, May-Aug. 2002, pp. 161-175.

Lee, et al., "A new methodology for gray-scale character segmentation and recognition," IEEE Transactions on Pattern Analysis and Machine Intelligence, Oct. 1996, pp. 1045-1050, vol. 18, No. 10.

Li et al., "Automatic Text Detection and Tracking in a Digital Video", IEEE Transactions on Image Processing, Jan. 2000, pp. 147-156, vol. 9 No. 1.

Matas, et al., "Robust Wide Baseline Stereo from Maximally Stable Extremal Regions", 2002, pp. 384-393.

Pal, et al., "Indian script character recognition: a survey", Pattern Recognition Society, Published by Elsevier Ltd, 2004, pp. 1887-1899.

Agrawal et al., "Generalization of Hindi OCR Using Adaptive Segmentation and Font Files," V. Govindaraju, S. Setlur (eds.), Guide to OCR for Indic Scripts, Advances in Pattern Recognition, DOI 10.1007/978-1-84800-330-9_10, Springer-Verlag London Limited 2009, pp. 181-207.

Nine components found

9

9

LOWER MODIFIER DETECTION AND EXTRACTION FROM DEVANAGARI TEXT IMAGES TO IMPROVE OCR PERFORMANCE

CROSS-REFERENCE TO RELATED APPLICATIONS

This application claims priority from U.S. Provisional Application No. 61/674,705, filed Jul. 23, 2012, entitled "Lower modifier detection and extraction from Devanagari text images to improve OCR performance," which is incorporated herein by reference in its entirety.

This application claims priority from U.S. Provisional Application No. 61/673,606, filed Jul. 19, 2012, entitled "Trellis based word decoder with reverse pass," which is incorporated herein by reference in its entirety.

This application claims priority from U.S. Provisional Application No. 61/674,824, filed on Jul. 23, 2012, entitled "Multi-stage character decoder for Devanagari OCR," which is incorporated herein by reference in its entirety.

This application claims priority from U.S. Provisional Application No. 61/677,291, filed on Jul. 30, 2012, entitled "Method of handling complex variants of words through prefix-tree based decoding for Devanagiri OCR," which is incorporated herein by reference in its entirety.

This application is a continuation-in-part (CIP) application of and claims priority from U.S. application Ser. No. 13/748,539, filed on Jan. 23, 2013, entitled "Identifying regions of text to merge in a natural image or video frame," which is incorporated herein by reference in its entirety.

This application is a CIP application of and claims priority from U.S. application Ser. No. 13/748,574, filed on Jan. 23, 2013, entitled "Rules for merging blocks of connected components in natural images," which is incorporated herein by reference in its entirety.

U.S. application Ser. Nos. 13/748,539 and 13/748,574 both claim priority from: (1) U.S. Provisional Application No. 61/673,703, filed on Jul. 19, 2012, entitled "Automatic correction of skew in natural images and video"; (2) U.S. Provisional Application No. 61/590,983, filed on Jan. 26, 2012, entitled "Detecting and correcting skew in regions of text in natural images"; (3) U.S. Provisional Application No. 61/590,966, filed on Jan. 26, 2012, entitled "Identifying regions of text to merge in a natural image or video frame"; and (4) U.S. Provisional Application No. 61/590,973, filed on Jan. 26, 2012, entitled "Rules for merging blocks of connected components in natural images", which are each incorporated herein by reference in their entireties.

BACKGROUND

I. Field of the Invention

This disclosure relates generally to optical character recognition (OCR), and more particularly to lower modifier (also referred to as lower maatra) detection and extraction in Devanagari script based languages.

II. Background

Most North Indic scripts (e.g., the Devanagari script, also called Nāgarī, which is used in India and Nepal) are written from left to right, do not have distinct letter cases, and are recognizable by a horizontal line that runs along the top of letters. Devanagari script is commonly used to write standard Hindi, Marathi, Nepali and Sanskrit. The Devanagari script may be used for many other languages as well, including Bhojpuri, Gujari, Pahari, Garhwali, Kumaoni, Konkani, Magahi, Maithili, Marwari, Bhili, Newari, Santhali, Tharu, Sindhi, Dogri and Sherpa.

To explain the fundamental principles of many North Indic scripts, Devanagari is used as an example. In Devanagari, a character is positioned into a core zone (in a center horizontal strip) and may extend to an upper zone 110 above the core zone and/or a lower zone 130 below the core zone. A letter or character may occupy just the core zone, both the core zone and the upper zone 110, both the core zone and the lower zone 130, or all three zones. Some base letters represent a standalone vowel. Other base letters represent a consonant and carries an inherent 'a' vowel sound. A vowel sound, as well as an absence of a vowel sound, require modification of these base consonants (having an inherent 'a') or require a separate letter. Vowels other than the inherent 'a' are written with diacritics (also termed top or upper modifiers if positioned above the core zone, bottom or lower modifiers if positioned below the core zone, diacritical marks, diacritical points, diacritical signs) placed either below or above the consonant. A horizontal headline (sometimes referred to as a headline, or a Shirorekha in Devanagari) delineates the top of an unmodified consonant and often joints a word together with a single headline per word. In some cases, a headline is broken or disjointed in a word. In other cases, a headline is unbroken across the length of the word. To cancel this inherent vowel, a final consonant is marked (sometimes called a virāma, halant or "killer stroke") is written below the consonant.

In some North Indic scripts, a full-letter form is used to represent a vowel sound that is unattached to a consonant. Two to five consonants may be concatenated or otherwise combined, for example, using accent marks placed above, below, to a side of the base consonant or with abbreviated consonant symbols, to form a compound character. When applied to North Indic scripts in general, these modifiers (e.g., upper and lower modifiers) add a great deal of complexity to the script due to the large variety. In fact, over a 1000 character combinations and contractions are possible. Currently, OCR systems have difficulty parsing such a complex set of character variations, especially distinguishing between a lower modifier and a stroke of a consonant that protrudes to the lower zone 130.

What is needed is an improved method of preforming OCR on characters having a headline as well as a possible modifier, for example, below a core zone of a character to extract both the manner and placement of articulations of consonants.

BRIEF SUMMARY

Disclosed are systems, apparatus and methods for segmenting of lower modifiers, which will help improve the OCR performance. Systems, apparatus and methods are used for detecting and extracting lower modifiers from a word image before performing optical character recognition (OCR). The method obtains a word image and performing a plurality of tests (e.g., a first test, a second test and a third test). The first test determines whether a vertical line spanning the height of the word image exists. The second test determines whether a jump of a number of components in the lower portion of the word image exists. The third test determines sparseness in a lower portion of the word image. The plurality of tests may run sequentially and/or in parallel. Results from the plurality of tests are used to decide whether a lower modifier exists by comparing and accumulating test results from the plurality of tests.

According to some aspects, disclosed is a method to extract lower modifiers from a word image, before performing optical character recognition (OCR), based on a plurality of tests comprising a first test, a second test and a third test, the method comprising: obtaining the word image, wherein the word image defines a height of the word image and a width of the word image; performing the first test to determine whether a vertical line spanning the height of the word image is present; performing the second test to determine whether a jump of a number of components exist in a lower portion of the word image; performing the third test to determine sparseness in the lower portion of the word image; and comparing test results from the first test, the second test and the third test to decide whether the lower modifier exists.

According to some aspects, disclosed is a mobile device for extracting lower modifiers from a word image, before performing optical character recognition (OCR), based on a plurality of tests comprising a first test, a second test and a third test, the mobile device comprising: a camera; a display; and a processor coupled to the camera and the display, wherein the processor comprises instructions to: obtain the word image, wherein the word image defines a height of the word image and a width of the word image; perform the first test to determine whether a vertical line spanning the height of the word image is present; perform the second test to determine whether a jump of a number of components exist in a lower portion of the word image; perform the third test to determine sparseness in the lower portion of the word image; and compare test results from the first test, the second test and the third test to decide whether the lower modifier exists.

According to some aspects, disclosed is a mobile device for extracting lower modifiers from a word image, before performing optical character recognition (OCR), based on a plurality of tests comprising a first test, a second test and a third test, the mobile device comprising: means for obtaining the word image, wherein the word image defines a height of the word image and a width of the word image; means for performing the first test to determine whether a vertical line spanning the height of the word image is present; means for performing the second test to determine whether a jump of a number of components exist in a lower portion of the word image; means for performing the third test to determine sparseness in the lower portion of the word image; and means for comparing test results from the first test, the second test and the third test to decide whether the lower modifier exists.

According to some aspects, disclosed is a mobile device for extracting lower modifiers from a word image, before performing optical character recognition (OCR), based on a plurality of tests comprising a first test, a second test and a third test, the mobile device comprising a processor and a memory wherein the memory includes software instructions to: obtain the word image, wherein the word image defines a height of the word image and a width of the word image; perform the first test to determine whether a vertical line spanning the height of the word image is present; perform the second test to determine whether a jump of a number of components exist in a lower portion of the word image; perform the third test to determine sparseness in the lower portion of the word image; and compare test results from the first test, the second test and the third test to decide whether the lower modifier exists.

According to some aspects, disclosed is a non-volatile computer-readable storage medium including program code stored thereon, comprising program code to extract lower modifiers from a word image, before performing optical character recognition (OCR), based on a plurality of tests comprising a first test, a second test and a third test, the program code to: obtain the word image, wherein the word image defines a height of the word image and a width of the word image; perform the first test to determine whether a vertical line spanning the height of the word image is present; perform the second test to determine whether a jump of a number of components exist in a lower portion of the word image; perform the third test to determine sparseness in the lower portion of the word image; and compare test results from the first test, the second test and the third test to decide whether the lower modifier exists.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

FIGS. 7A-D and 8A-C show example word images without and with lower modifiers.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Systems, apparatus and methods for performing OCR are presented. The method performs OCR at a word level by obtaining a word image and performing a plurality of tests, comprising a first test, a second test and/or a third test. The first test determines whether a vertical line spanning the height of the word image exists. The second test determines whether a jump of a number of components in a lower portion in the word image exists. The third test determines sparseness in a lower portion of the word image. The three tests may be formed sequentially, in parallel or as a combination with any test being performed before or after another test. Results from the multiple tests are used to decide whether a lower modifier exists by comparing the test results from the first test, the second test and the third test. Devanagari script, used to write the language of Hindi, serves as a prototype script in this disclosure, with minor variations or additions, to other North Indic scripts.

Figure 1:
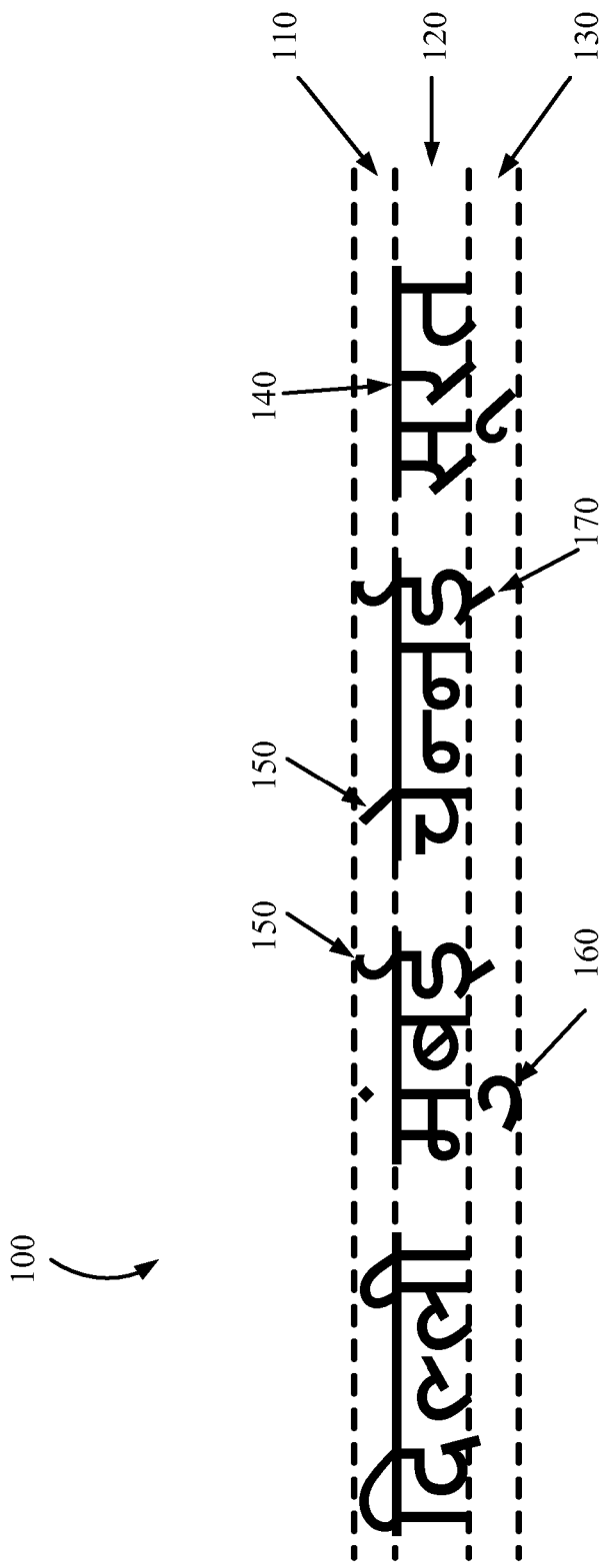
FIG. 1 shows example Devanagari text.

FIG. 1 shows example Devanagari text 100. The example line of text may be divided into three horizontal strips or zones: an upper zone 110, a core zone 120 and a lower zone 130. The core zone holds the base character. The core zone is delineated on an upper side with a headline or Shirorekha 140. Above the core zone is the upper zone 110, which holds an upper modifier 150 (or upper "maatra"). Below the core zone 120 is the lower zone 130, which may hold either a lower modifier 160 (or lower "maatra") or part of a base character that protrudes (lower zone protrusion 170) from the core zone 120 into the lower zone 130.

Figure 2:
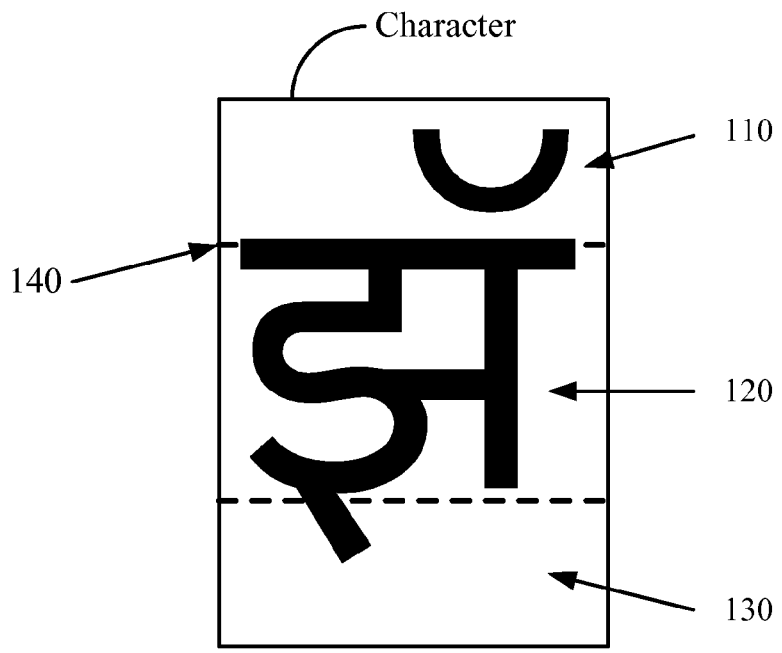
FIGS. 2-5 show possible divisions of Devanagari text.
Figure 3:
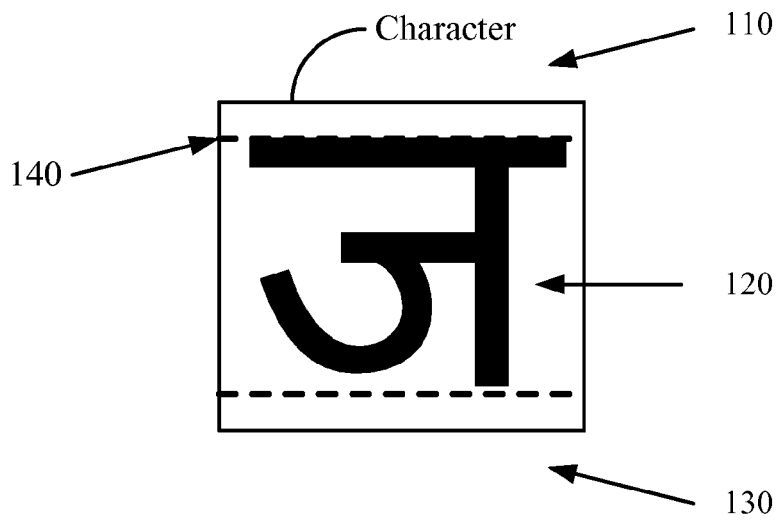
Figure 4:
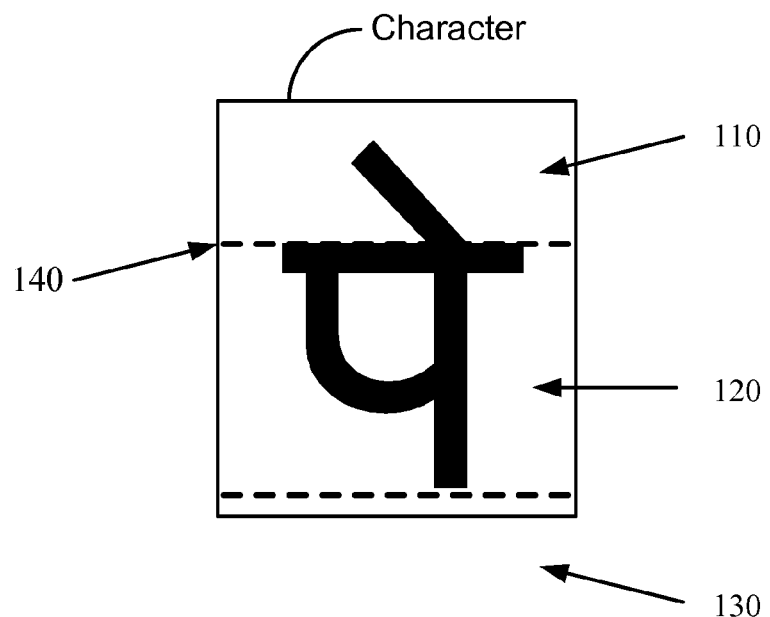
Figure 5:
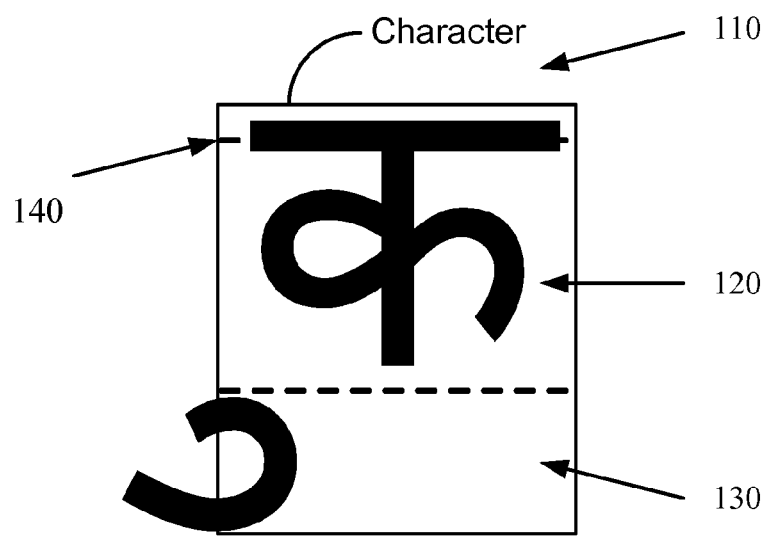

FIGS. 2-5 show possible divisions of Devanagari text. Some characters, especially modified characters, may include script extending to the upper zone 110 and/or the lower zone 130. FIG. 2 shows a character that occupies the upper zone 110, core zone 120 and the lower zone 130. The character shows a core consonant having an extension protruding (lower zone protrusion 170) into the lower zone 130. In this case, the extension is not a vowel modification but part of the base character. The character also includes a vowel modifier in the upper zone 110 modifying the core consonant. Other characters have no script in the upper and lower zones (110, 130), leaving these zones empty, such as the consonant, which occupies just the core zone 120. FIG. 3 shows a character that occupies only the core zone 120 but not the upper zone 110 or the lower zone 130. FIG. 4 shows a character that occupies the upper zone 110 and core zone 120 but not the lower zone 130. This consonant, which occupies the core zone 120, includes a vowel modifier that occupies the upper zone 110. FIG. 5 shows another character that occupies the core zone 120 and lower zone 130 but not the upper zone 110. This consonant, which occupies the core zone 120, includes a vowel modifier that occupies the lower zone 130.

Figure 6:
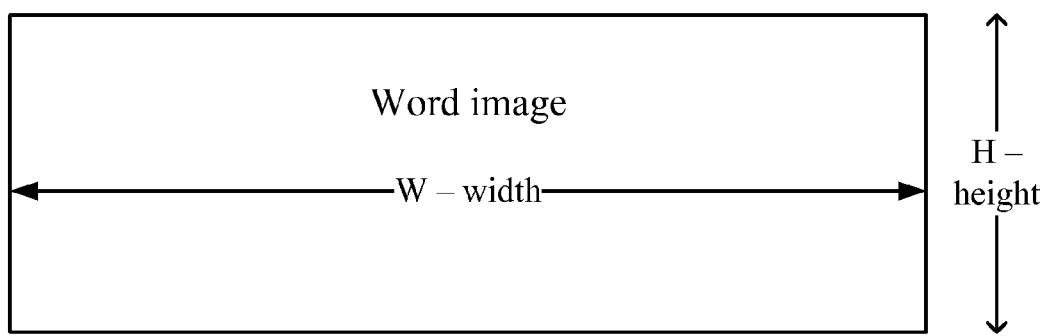
FIG. 6 illustrates a word image, which defines a height of the word image and a width of the word image.

FIG. 6 illustrates a word image, which defines a height of the word image and a width of the word image. A word image may or may not include one or more upper modifiers or one or more lower modifiers. A word image may be extracted from real-world scene captured through the camera, a frame of a video sequence, or a pre-stored frame in memory. For example, a user may direct his camera phone to a menu. The camera phone then captures an image, isolates at least one region containing text, then extracts a word image from the region. The extracted word image is binarized (i.e., represented in binary or in a two-level system) where the text region is assigned a binary value of '1' and background region is assigned a binary value of '0' for example. The resulting binary image may be later used for OCR processing. Alternatively, the user receives a stream of still or video images and selects one image to perform OCR.

Some word images include just a core zone 120. Other word images include both a core zone 120 and an upper zone 110 but not a lower zone 130. Still other word images include both a core zone 120 and a lower zone 130 but not an upper zone 110. An OCR application may determine which type of word is captured within the boundaries of the word image. Specifically, methods described herein help to determine whether a lower accent mark exists in the lower zone 130. At the time a word image is captured, the OCR application does not know whether the word image includes upper modifiers, lower modifiers or lower extensions.

Algorithms described herein aid the OCR application in determining whether a word image includes: (1) just a core zone 120; (2) both a core zone 120 and an upper zone 110 but not a lower zone 130; (3) both a core zone 120 and a lower zone 130 but not an upper zone 110; or (4) each of core, upper and lower zones (110, 130). Multiple tests are performed on a word image to determine which zones to include when performing OCR. The tests described below may be performed in any order, in parallel or a combination of both. A pair of tests may be performed (i.e., the first and second tests, the first and third tests, or the second and third tests) or all three tests may be performed. Alternatively, additional and/or different tests may be performed where each test gives an indication whether a lower modifier exists in the lower zone 130 of the word image.

FIGS. 7A-D and 8A-C show example word images without and with lower modifiers. In FIGS. 7A-7D, various example words without any lower modifiers are shown. That is, the word images do not contain a lower zone 130 but do include an upper zone 110. In FIGS. 8A-8C, various example words with at least one lower modifier are shown. That is, the word images do include a lower zone 130 but may or may not include an upper zone 110.

Figure 9:
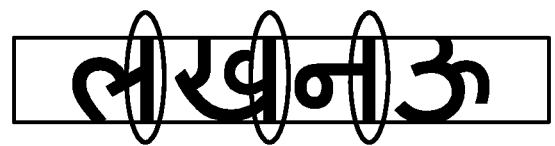
FIGS. 9 and 10 illustrate example word images undergoing a first test to determine whether a vertical line spans the height of the word image, in accordance with some embodiments of the present invention.
Figure 10:

FIGS. 9 and 10 illustrate example word images undergoing a first test to determine whether a vertical line (circled) spans the height of the word image, in accordance with some embodiments of the present invention. The word image has been modified by removing the headline 140 and script above the headline 140. The figures show a word image, after a headline 140 and upper zone 110 have been removed. In FIG. 9, the vertical lines span the height of the word image. No character in the word image extends into the lower zone 130. In FIG. 10, on the other hand, a first character of the word image extends into the lower zone 130, in this case, with a lower modifier. The last character of the word image also extends into the lower zone 130, but in this case, the base character extends or protrudes down from the core zone 120 into the lower zone 130. No vertical line exists that spans the height of the word image.

The first test compares the length of vertical strokes to the height of the word image. If the word height, after the headline 140 and upper zone 110 are removed from the word image, is comparable to vertical stroke height, then there is most likely insufficient room for a lower zone 130, and thus, no lower modifiers (as in FIG. 9). In this case, probably no lower zone exists. Specifically, a processor determines a height of the vertical line, for example by performing a vertical projection and using the maximum of the vertical projection as the height of the vertical stroke. Next, the processor compares the height of the vertical line to the height of the word image. If the height of the word image is less than the sum of the height of the vertical line and a threshold length, the processor indicates a probable lack of a lower modifier by incrementing a first variable by a first threshold, and otherwise, incrementing a second variable by a second threshold. For example, if the height of the vertical stroke is less than a percentage, say 80%, of the height of the word image, then the word image probably does not contain a lower zone 130. The height of the word image may be determined after a word image is stripped of any upper zone 110 and possible a headline 140 as shown. The first and second variables may be combined into a single variable. For example, the processor indicates a probable lack of a lower modifier by incrementing a common variable by a first threshold, and otherwise, decrementing the common variable by a second threshold.

Figure 11A:
FIGS. 11A-11G and 12A-12B illustrate a second test to determine whether a jump of a number of components exist in a lower portion the word image, in accordance with some embodiments of the present invention.
Figure 11B:
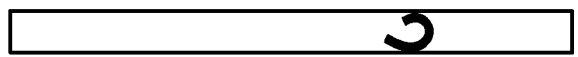
Figure 11C:
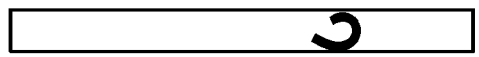
Figure 11D:
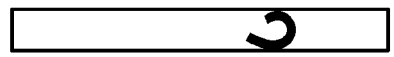
Figure 11E:
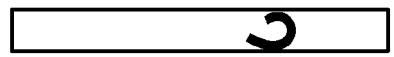
Figure 11F:
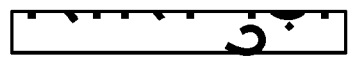
Figure 11G:
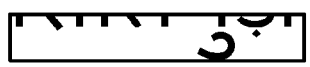

FIGS. 11A-11G and 12A-12B illustrate a second test to determine whether a jump of a number of components exist in a lower portion of the word image, in accordance with some embodiments of the present invention. In FIG. 11A-11G, an aspect of the second test is shown. A word image, shown in FIG. 11A, is scanned across a line at several points in the word image. For example in FIG. 11B, a bottom 25% of the image below the headline 140 is scanned to count a number of separate features or separate components on pixel bases, which, in this case, is shown as one. The percentage is increased until the percentage increases are exhausted or a jump in the number of pixels components is counted. In FIG. 11C, a bottom 30% of the image below the headline 140 is scanned to count the number of separate components, also shown as one. In FIG. 11D, a bottom 35% of the image below the headline 140 is scanned to count the number of separate components, again shown as one. In FIG. 11E, a bottom 40% of the image below the headline 140 is scanned to count the number of separate components, shown as two. In FIG. 11F, a bottom 45% of the image below the headline 140 is scanned to count the number of separate components, which now jumps from two to nine. Processing may stop here but as an example, 50% is considered. In FIG. 11G, a bottom 50% of the image below the headline 140 is scanned to count the number of separate components, also shown as nine.

In some cases, a jump is when a number of separate features or separate components increase by three or more between two adjacent scan lines. In this case, features are counted within the word image at various percentages (25%, 30%, 35%, 40%, 45% and 50%). The counted number of pixel components are 1, 1, 1, 2, 9 and 9, respectively, with this word image. In this example, we started with a percentage value of 25% and moved to 50% in steps of 5%. Alternatively, a starting point may begin with another percentage value, such as 5%, 10% etc., or a particular vertical pixel position.

In the example above, a jump does not occur until the counted number of pixel components goes from 2 to 9 (where a jump threshold is set to three and the difference of 22 and 9 is seven; seven is greater than or equal to the jump threshold of three). No jump occurs from 1 to 1, 1 to 2, or 9 to 9 in the sequence {1, 1, 1, 2, 9, 9} representing a counted number of pixel components at corresponding percentages {25%, 30%, 35%, 40%, 45%, 50%}.

Figure 12A:
Figure 12B:
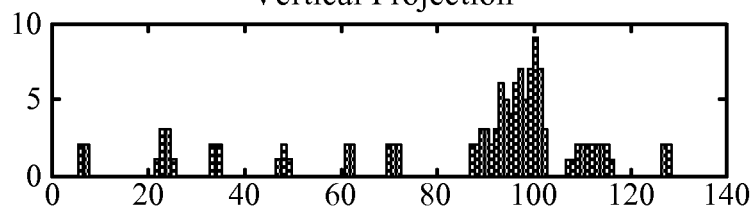

If a jump exists, then a lower zone 130 probably exists and contains very few strokes. As the scan line increase in percentage, or cuts the word image at a higher line, pixel features of characters in the core zone 120 are counted. The position of the jump (e.g., between 40% and 45%) delineates the border of the core zone 120 and the lower zone 130. If such delineation exists, then lower modifiers probably exist. Specifically, a processor scans a bottom portion of the word image to determine whether the jump in the number of components exists; and if the jump is less than a threshold jump, then indicating the probable lack of the lower modifier by incrementing the first variable by a third threshold, and otherwise, incrementing the second variable by a fourth threshold. FIG. 12A shows a final 50% of the word image (similar to FIG. 11G). FIG. 12B shows its associated vertical projection of the final 50% where a maximum counted number of pixel components is shown as 9.

Figure 13A:
FIGS. 13A-13D and 14A-14D illustrate a third test to determine sparseness in a lower portion of the word image, in accordance with some embodiments of the present invention.
Figure 13B:
Figure 13C:
Figure 13D:
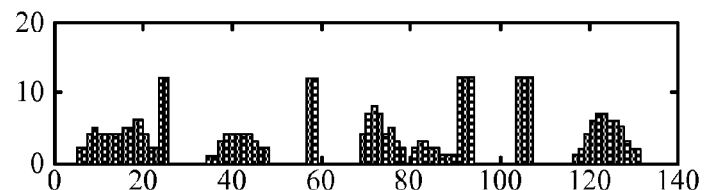

FIGS. 13A-D and 14A-D illustrate a third test to determine sparseness in a lower portion of the word image, in accordance with some embodiments of the present invention. A full word and its parts are shown for reference in FIG. 13A. If a lower portion of a word image is sparsely occupied, a lower zone 130 probably exists. FIG. 13B shows the same word but below the shirorekha 140. FIG. 13C shows the bottom 25% of the image below the shirorekha 140. FIG. 13D shows a projection of FIG. 13C. A processor performs the projection of the lower portion of the word image. For example, the lower 25% of the word image after a headline 140 has been removed. The processor counts components having at least a height greater than a threshold height or a width greater than a threshold width to result in a component count. The lower portion of some word images may contain components that are neither wide nor tall; these components may be considered as noise and are not counted. That is, the number of pixels in a column may be greater than a threshold to be counted.

FIG. 13A shows a word image without a lower zone 130 (i.e., no lower maatra). Several components exist that are either tall or wide or both. The count is high so a lower zone 130 probably does not exist.

Figure 14A:
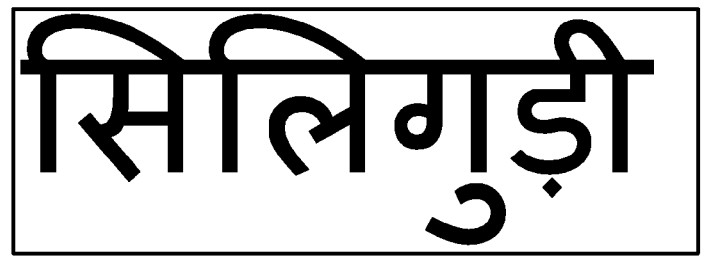
Figure 14B:
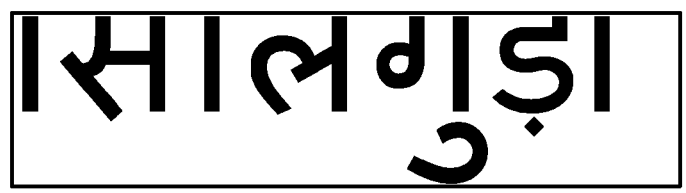
Figure 14C:
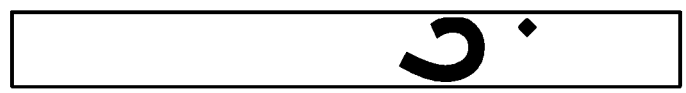
Figure 14D:
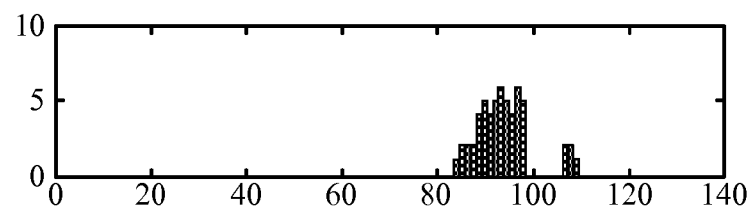

FIG. 14A shows a word image with a modifier in a lower zone 130. The count is low so a lower zone 130 probably a lower maatra does exist. For example, if the pixel component count is greater than a threshold count, then the processor indicates the probable lack of the lower modifier by incrementing the first variable by a fifth threshold, and otherwise, incrementing the second variable by a sixth threshold. In FIG. 14B, an image is shown of FIG. 14A but below the shirorekha. In FIG. 14C, the bottom 25% of the image below the shirorekha 140 is shown. FIG. 14D shows a vertical projection of the bottom 25% of the image below the shirorekha 140. In this case, the pixel density shows a "sparse" projection, therefore the image contains few significant component in the bottom 25% so most likely the word image contains a shirorekha 140.

By performing two, three or more tests, each having soft decisions where a variable or variables are adjusted in each test by various thresholds, test results accumulate in the variable(s) such that an individual test might decide one way but the conglomeration of tests and thresholds concludes the other way. For example, an individual first test indicates a lower zone 130 does not exist but results from a second and third test may indicate a lower zone 130 does exist. The overall test results in the variable(s) may lead to a conclusion that a lower zone 130 does exist even though one test indicates a lower zone 130 does not exist.

The thresholds used are set based on the confidence of a positive or negative decision from the test. For example, the first test may increment a common variable by 2.0 if a decision is that a vertical line is present, or decrement the common variable by 0.5 if the decision is that a vertical line is not present. If two variables are used, a first variable may be incremented by the first threshold (2.0) or a second variable may be incremented by the second threshold (0.5). The second test may increment the common variable by 1.0 if a jump exists and otherwise decrement the common variable by 0.5. The third test may increment the common variable by 0.5 if sparsity exists and otherwise decrement the common variable by 1.0. The overall test results may be determined by the common variable being positive or negative. If two variables are uses, the greater of the two variables decides the overall results. If the confidence of the tests changes, for example, with fine tuning or adding different tests, the thresholds may be changes as well.

Figure 15:
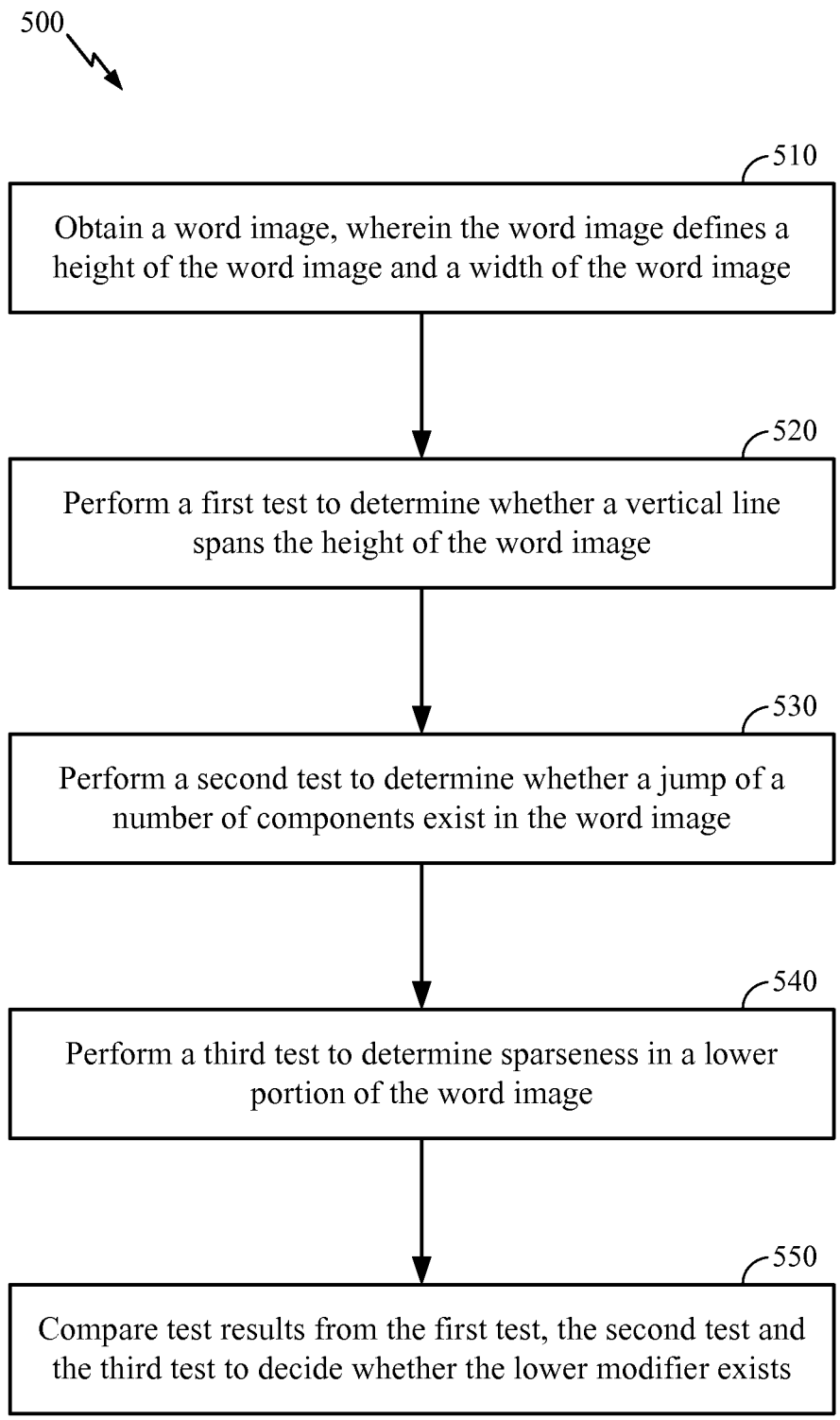
FIG. 15 illustrates a method of combining multiple tests to decide whether a lower modifier exists, in accordance with some embodiments of the present invention.

FIG. 15 illustrates a method 500 of combining multiple tests to decide whether a lower modifier exists, in accordance with some embodiments of the present invention. At 510, a processor obtains a word image, wherein the word image defines a height of the word image and a width of the word image. At 520, the processor performs a first test to determine whether a vertical line spanning the height of the word image is present. At 530, the processor performs a second test to determine whether a jump of a number of components exist in a lower portion of the word image. At 540, the processor performs a third test to determine sparseness in the lower portion of the word image. The three tests may be formed sequentially, in parallel or as a combination with any test being performed before or after another test. At 550, the processor compares the test results from the first test, the second test and the third test to decide whether the lower modifier exists. Alternatively, any pair of tests may be used rather than these three specific tests.

In some embodiments, the method begins with obtaining the word image. Obtaining the word image may comprise obtaining an image containing text images; isolating a region containing the text images; and extracting a word image from the region. In some embodiments, the method converts the word image to binary to assist computing various vertical projections and component extraction. In some embodiments, the word image includes an image of Devanagari text. In some embodiments, the method further comprising extracting a lower modifier based on the comparing.

Some embodiments include a mobile device for performing OCR based on a plurality of tests comprising a first test, a second test and a third test, the mobile device comprising: a camera; a display; and a processor coupled to the camera and the display. The processor comprises instructions for: (1) obtaining a word image, wherein the word image defines a height of the word image and a width of the word image; (2) performing the first test to determine whether a vertical line spanning the height of the word image is present; (3) performing the second test to determine whether a jump of a number of components exist in a lower portion of the word image; (4) performing the third test to determine sparseness in the lower portion of the word image; and (5) comparing test results from the first test, the second test and the third test to decide whether the lower modifier exists.

Figure 16:
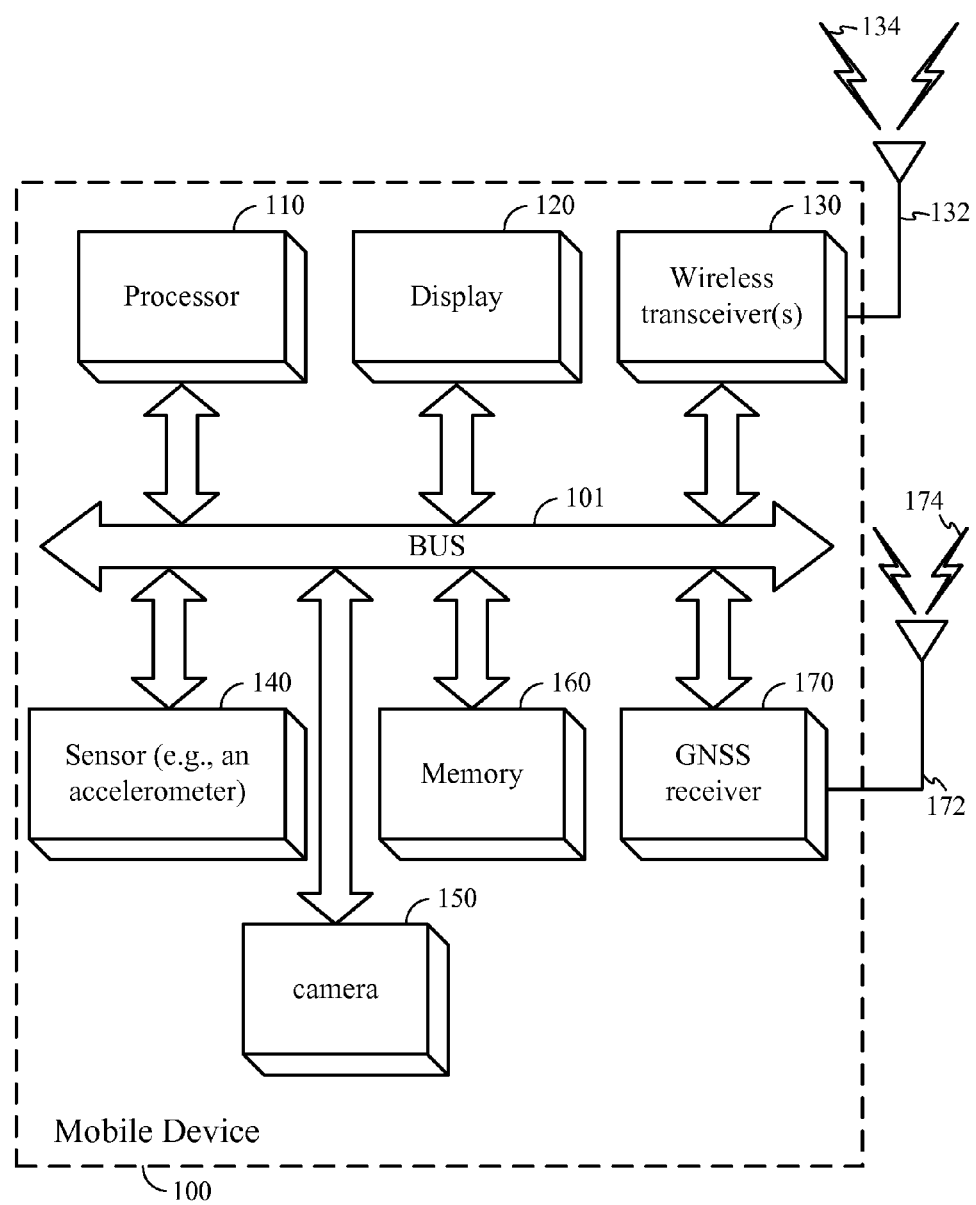
FIG. 16 shows a mobile device and its components, in accordance with some embodiments of the present invention.

FIG. 16 shows a mobile device and its components, in accordance with some embodiments of the present invention. The mobile device 100 includes a processor 110, a display 120, an optional wireless transceiver 130 electrically connected to an antenna 132 to communicate signals 134, a sensor 140, a camera 150, memory 160 and an optional GNSS receiver 170 electrically connected to an antenna 172 to receive signals 174. These devices may be coupled together with bus 101, directed connected together, or a combination of both. The processor 110 may be a general-purpose processor and/or a digital signal processor (DSP). The display 120 may display the word image, an OCR result of the word image (with or without lower modifiers) and/or a translation of the OCR result of the word image. The sensor 140 may include an accelerometer, a gyroscope, a barometer, and the like. The camera 150 may be used to capture the word image from a natural scene, such as from an image of a menu, street sign, billboard, magazine, book, computer screen or the like. The memory 160 may contain executable code or software instructions for the processor 110 to perform methods described herein.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method to extract lower modifiers from a word image, before performing optical character recognition (OCR), based on a plurality of tests comprising a first test, a second test and a third test, the method comprising:
   obtaining the word image, wherein the word image defines a height of the word image and a width of the word image;
   performing the first test to determine whether a vertical line spanning the height of the word image is present;

performing the second test to determine whether a jump of a number of components exist in a lower portion of the word image;

performing the third test to determine sparseness in the lower portion of the word image; and comparing test results from the first test, the second test and the third test to decide whether a lower modifier exists.

2. The method of claim 1, wherein obtaining the word image comprises:

obtaining an image containing at least one region having text;

isolating the at least one region containing text; and extracting the word image from the at least one region.

3. The method of claim 1, wherein obtaining the word image comprises converting the word image into a binary representation.

4. The method of claim 1, wherein the word image comprises a headline, wherein the word image further defines a height of the word image below the headline, and wherein the first test comprises:

determining a presence of the vertical line;

determining a height of the vertical line;

comparing the height of the vertical line to the height of the word image below the headline plus a threshold length; and incrementing a first variable by a first threshold to indicate a probable lack of a lower modifier, if the height of the word image below the headline is less than the height of the vertical line plus the threshold length, and otherwise, incrementing a second variable by a second threshold.

5. The method of claim 1, wherein the jump exists when a count increase by at least a jump threshold, and wherein the second test comprises:

scanning a bottom portion of the word image to determine whether the jump in the number of components exists; and incrementing a first variable by a third threshold when no jump exists thereby indicating a probable lack of the lower modifier, and otherwise, incrementing a second variable by a fourth threshold.

6. The method of claim 5, wherein the jump threshold is three.

7. The method of claim 1, wherein the third test comprises:

performing a vertical projection of the lower portion of the word image;

counting components having at least a height greater than a height threshold or a width greater than a width threshold to result in a component count; and incrementing a first variable by a fifth threshold to indicate a probable lack of the lower modifier, if the component count is greater than a threshold, and otherwise, incrementing a second variable by a sixth threshold.

8. The method of claim 1, wherein the word image comprises Devanagari text.

9. The method of claim 1, further comprising extracting a lower modifier based on the comparing.

10. The method of claim 1, further comprising determining a location of a lower modifier based on results from at least one of the plurality of tests.

11. A mobile device for extracting lower modifiers from a word image, before performing optical character recognition (OCR), based on a plurality of tests comprising a first test, a second test and a third test, the mobile device comprising:

a camera;

a display; and a processor coupled to the camera and the display, wherein the processor comprises instructions to:

obtain the word image, wherein the word image defines a height of the word image and a width of the word image;

perform the first test to determine whether a vertical line spanning the height of the word image is present;

perform the second test to determine whether a jump of a number of components exist in a lower portion of the word image;

perform the third test to determine sparseness in the lower portion of the word image; and compare test results from the first test, the second test and the third test to decide whether a lower modifier exists.

12. The mobile device of claim 11, further comprising instructions to:

obtain an image containing at least one region having text;

isolate the at least one region containing text; and extract the word image from the at least one region.

13. The mobile device of claim 11, further comprising instructions to extract a lower modifier based on the comparing.

14. The mobile device of claim 11, further comprising instructions to determine a location of a lower modifier based on results from at least one of the plurality of tests.

15. A mobile device for extracting lower modifiers from a word image, before performing optical character recognition (OCR), based on a plurality of tests comprising a first test, a second test and a third test, the mobile device comprising:

means for obtaining the word image, wherein the word image defines a height of the word image and a width of the word image;

means for performing the first test to determine whether a vertical line spanning the height of the word image is present;

means for performing the second test to determine whether a jump of a number of components exist in a lower portion of the word image;

means for performing the third test to determine sparseness in the lower portion of the word image; and means for comparing test results from the first test, the second test and the third test to decide whether a lower modifier exists.

16. The mobile device of claim 15, further comprising:

means for obtaining an image containing at least one region having text;

means for isolating the at least one region containing text; and means for extracting the word image from the at least one region.

17. The mobile device of claim 15, further comprising means for extracting a lower modifier based on the comparing.

18. The mobile device of claim 15, further comprising means for determining a location of a lower modifier based on results from at least one of the plurality of tests.

19. A mobile device for extracting lower modifiers from a word image, before performing optical character recognition (OCR), based on a plurality of tests comprising a first test, a second test and a third test, the mobile device comprising a processor and a memory wherein the memory includes software instructions to:

obtain the word image, wherein the word image defines a height of the word image and a width of the word image;

perform the first test to determine whether a vertical line spanning the height of the word image is present;

perform the second test to determine whether a jump of a number of components exist in a lower portion of the word image;

perform the third test to determine sparseness in the lower portion of the word image; and compare test results from the first test, the second test and the third test to decide whether a lower modifier exists.

20. The mobile device of claim 19, wherein the instructions further comprise instructions to extract a lower modifier based on the comparing.

21. The mobile device of claim 19, wherein the instructions further comprise instructions to determine a location of a lower modifier based on results from at least one of the plurality of tests.

22. A non-volatile computer-readable storage medium including program code stored thereon, comprising program code to extract lower modifiers from a word image, before performing optical character recognition (OCR), based on a plurality of tests comprising a first test, a second test and a third test, the program code to:

obtain the word image, wherein the word image defines a height of the word image and a width of the word image;

perform the first test to determine whether a vertical line spanning the height of the word image is present;

perform the second test to determine whether a jump of a number of components exist in a lower portion of the word image;

perform the third test to determine sparseness in the lower portion of the word image; and compare test results from the first test, the second test and the third test to decide whether a lower modifier exists.

\* \* \* \* \*